Patented Sept. 6, 1932

1,875,446

UNITED STATES PATENT OFFICE

ROBERT HALLER, OF RIEHEN, NEAR BASEL, SWITZERLAND, ASSIGNOR TO SOCIETY OF CHEMICAL INDUSTRY IN BASLE, OF BASEL, SWITZERLAND

PROCESS FOR PRODUCING FAST TINTS ON THE FIBER

No Drawing. Application filed August 29, 1929, Serial No. 389,324, and in Switzerland September 7, 1928.

The present invention relates to a new process for producing fast tints on the fiber. It comprises the new process, the new dyestuffs and the material which has been dyed with the new dyestuffs.

The production of fast tints on the fiber by uniting usual coupling components with diazotizing components is well-known.

The present invention is based on the surprising discovery that very valuable dyeings can be produced on materials by treating the latter, which have been impregnated with leuco-compounds, with diazo-compounds. By the conception leuco-compounds there are to be understood the leuco-compounds from dyestuffs, as well as the leuco-compounds from other products, and the ester salts which the said leuco-compounds can form with mono- or bivalent acids. There are thus obtained dyeings that are characterized by their intensity and their fastness properties.

The process may be conducted in a very simple manner. For example, the goods to be dyed, such as fibrous material, are saturated in the vat, thoroughly pressed, rinsed in a bath containing a small quantity of sodium hydrosulfite and an alkali, again pressed and then introduced into a solution of a diazo-compound, whereupon coupling immediately occurs with formation of the dyestuff on the material. Both the operation of saturating the material with the leuco-compound and the coupling operation may be conducted in presence of assistants, such as a protective colloid, a wetting agent, a dispersing agent or the like. In this manner there is produced a dyeing which, according to the nature of the leuco-compound and diazo-compound used, may differ completely from the normal dyeing produced by the vat-dyestuff. The dyeings obtainable in accordance with the invention are in part distinguished by remarkable properties of fastness, which often surpass those of the dyeing produced by the vat-dyestuff used.

The invention is applicable for dyeing all materials which are capable of being dyed by means of vat-dyestuffs; among others, various textile materials, such as cotton, wool, loaded or unloaded silk and artificial fibrous material of all kinds.

The following examples illustrate the invention:—

*Example 1*

The parent vat is prepared in the following manner:

1 kilo of Ciba Blue 2B (cf. Schultz, 1914, No. 881) in powder form or the corresponding quantity of the dyestuff in paste form is made into a paste with 100 grams of Solapol oil F (strongly sulfonated castor oil), or a similar assistant, and 150 litres of hot water. There are then added 2.5 litres of a caustic soda solution of 36° Bé. and 2 kilos of hydrosulfite concentrated powder are gradually strewn into the liquid whilst stirring.

At 80° C. the dyestuff is reduced in 10 to 15 minutes, whereupon the parent vat thus formed is added to the dyeing vat to which some hydrosulfite and caustic soda have previously been added. The goods are introduced and allowed to remain in the vat for ½–¾ hour at 60° C. in the manner usual in vat dyeing. They are then quickly pressed and rinsed in a cold bath containing per litre 5 grams of hydrosulfite concentrated powder and 10 grams of caustic soda solution of 40° Bé.; they are then rinsed for a short time in water, pressed and introduced into a diazo-solution prepared in the following manner:—

10 parts of the dyestuff prepared by coupling diazo-benzene and α-naphthylamine and 15 parts of hydrochloric acid of 20° Bé. are stirred together with 500 parts of cold water. Within 5 minutes there are added 3.5 parts of sodium nitrite dissolved in 50 parts of water, and stirring is continued for ½ hour. The whole is then filtered, made up to 1000 parts by adding cold water, adding before coupling 20 parts of sodium acetate.

The material is dyed an intense brown fast to chlorine.

A similar shade is obtained in the following manner:—

9 parts of the sodium salt of the sulfuric acid ester of the leuco-tetrabromindigo are dissolved in 400 parts of warm water. There are then added 400 parts of cold water, 200 parts of anhydrous sodium sulfate, 200 parts of cold water, and 5 parts of Turkey red oil. The goods are then introduced into the dyeing bath thus prepared, and dyed for ½ hour at 25–30° C. They are then rinsed and treated with the diazo-solution above described.

Example 2

The goods are impregnated with the product of the sulfurization of anthracene (cf. U. S. Patent No. 922,282) in a strongly alkaline vat in the manner usual in dyeing with Cibanone dyestuffs and rinsed in the manner indicated in Example 1.

Coupling is conducted in the manner indicated in Example 1, the goods being developed in a diazo-solution prepared in the following manner:—

8 parts of 4:4'-diamino-2-methyl-5-methoxy-1:1'-azobenzene are dissolved in 500 parts of cold water and 36 parts of hydrochloric acid of 20° Bé. Within 5 minutes there is added a solution of 4.5 parts of sodium nitrite in 50 parts of water, and the whole is allowed to stand for 15 minutes after which time diazotization is complete. Before use, the solution is made up to 1000 parts by the addition of cold water, and neutralized by the addition of 8–9 parts of a solution of sodium acetate of 20 per cent strength.

Beautiful full brown tints are produced.

to 1 hour, 20 grams of Glaubers salt per litre of the dyebath being added if necessary in order to improve the absorption of the leuco-compound by the goods.

The goods impregnated with the leuco-compound as above described are rinsed in an alkaline hydrosulfite bath in the manner indicated in Example 1, rinsed in fresh water and introduced into a diazo-solution prepared in the following manner:—

8 grams of benzene-azo-α-napththylamine and 15 cc. of hydrochloric acid of 20° Bé. are stirred with 500 cc. of cold water. Within 5 minutes there is added a solution of 3.5 grams of sodium nitrite in 50 cc. of water and stirring is continued for ½ hour. Before use, the solution is filtered, made up with cold water to 1 litre and neutralized with 50 cc. of a solution of sodium acetate of 20 per cent. strength, so that it no longer colours Congo paper blue. In this manner there is produced a very intense olive dyeing.

Instead of aminoazo-compounds there may obviously be used diazo-components of simpler constitution derived from amines of the benzene or napththlene series, such as diazobenzene, diazo-toluene, diazo-napththalene and nuclear substitution products of these compounds. Generally, however, deeper shades are produced by using an aminoazo-compound as diazo-component.

The following table shows the tints which can be obtained by some of the numerous combinations in accordance with the invention, the name Schultz referring to G. Schultz, Farbstofftabellen, edition 1914.

| | Leuco-compound | Diazo-compound | Tint |
|---|---|---|---|
| 1. | Ciba violet B (Schultz No. 901) | 4-chloro-2-amino-diphenylether | Red-brown. |
| 2. | Ciba violet B........idem | Aminoazotoluene | Red-brown. |
| 3. | Ciba yellow G (Schultz No. 890) | Ortho-phenetidine | Dull yellow. |
| 4. | Ciba yellow G........idem | Benzene-azo-α-naphthylamine | Yellow brown. |
| 5. | Cibanone blue RS (Colour Index No. 1106) | Benzene-azo-α-naphthylamine | Dark red-brown. |
| 6. | Ciba heliotrope B (Schultz No. 897) | 4'-chloro-4-amino-2-methyl-5-methoxy-1:1'-azobenzene | Bordeaux. |
| 7. | Ciba violet 3B (Schultz No. 900) | Benzene-azo-α-naphthylamine | Deep brown. |
| 8. | Ciba bordeaux B (Schultz No. 919) | 4:4'-diamino-2-methyl-5-methoxy-1:1'-azobenzene | Red-brown. |
| 9. | Ciba rose B (Colour Index No. 1207) | Benzene-azo-α-naphthylamine | Brown. |
| 10. | Ciba scarlet G (Schultz No. 907) | 4:4'-diamino-2-methyl-5-methoxy-1:1'-azobenzene | Bright red-brown. |
| 11. | Ciba red G (Schultz No. 906) | Benzene-azo-α-naphthylamine | Deep brown. |
| 12. | Ciba blue 2B (Schultz No. 181) | Benzene-azo-α-naphthylamine | Deep brown. |
| 13. | Ciba grey G (Schultz No. 899) | Benzene-azo-α-naphthylamine | Brown. |
| 14. | Cibanone yellow R (Schultz No. 795) | Benzene-azo-α-naphthylamine | Dark brown. |
| 15. | Cibanone orange R (Schultz No. 792) | Benzene-azo-α-naphthylamine | Dark brown. |
| 16. | Cibanone blue G (Colour Index No. 1115) | 4'-chloro-4-amino-2-methyl-5-methoxy-1:1'-azobenzene | Dark olive. |
| 17. | Cibanone green B (Schultz No. 793) | Benzene-azo-α-naphthylamine | Dark brown. |
| 18. | Cibanone green B (Schultz No. 793) | 4:4'-diamino-2-methyl-5-methoxy-1:1'-azobenzene | Dark green. |
| 19. | The sodium salt of the sulfuric acid ester of leuco-indigo | 4'-chloro-4-amino-2-methyl-5-methoxy-1:1'-azobenzene | Brownish-olive. |

Example 3

A vat is prepared in the following manner:—

1 kilo of Pyrogene green 3G (cf. Schultz, 1931, No. 117) is mixed with 1.5 kilo of crystalline sodium sulfide and there are added to the mixture 10–16 litres of boiling water. The solution is added, after filtering, to the dyebath which contains 2 grams of calcined sodium carbonate per litre of liquor. The goods to be dyed are immersed in the bath at 60–80° C. for ¾

What I claim is:—

1. Process for producing fast tints on the fiber, consisting in coupling reduced vat-dyestuffs, with which the fiber has been impregnated with diazo-compounds.

2. Process for producing fast tints on the fiber, consisting in coupling reduced vat-dyestuffs, with which the fiber has been impregnated with diazotized amino-azo-dyestuffs.

In witness whereof I have hereunto signed my name this 19th day of August, 1929.

ROBERT HALLER.